United States Patent
Tarumi

(10) Patent No.: US 9,821,695 B2
(45) Date of Patent: Nov. 21, 2017

(54) VEHICLE SEAT

(71) Applicant: TOYOTA BOSHOKU KABUSHIKI KAISHA, Aichi-ken (JP)

(72) Inventor: Akira Tarumi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/205,545

(22) Filed: Jul. 8, 2016

(65) Prior Publication Data

US 2017/0015227 A1   Jan. 19, 2017

(30) Foreign Application Priority Data

Jul. 13, 2015  (JP) ................................. 2015-139584

(51) Int. Cl.
| | |
|---|---|
| *B60N 2/68* | (2006.01) |
| *B60N 2/58* | (2006.01) |
| *B60R 21/207* | (2006.01) |
| *B60R 21/215* | (2011.01) |
| *B60R 21/00* | (2006.01) |

(52) U.S. Cl.
CPC ............. *B60N 2/68* (2013.01); *B60N 2/58* (2013.01); *B60N 2/5841* (2013.01); *B60N 2/686* (2013.01); *B60R 21/207* (2013.01); *B60R 21/215* (2013.01); *B60N 2002/5808* (2013.01); *B60R 2021/0006* (2013.01); *B60R 2021/0032* (2013.01)

(58) Field of Classification Search
CPC combination set(s) only.
See application file for complete search history.

(56) References Cited

U.S. PATENT DOCUMENTS 5,651,582 A * 7/1997 Nakano ............... B60R 21/207
                                                            280/730.2
5,810,389 A * 9/1998 Yamaji ................ B60R 21/207
                                                            280/728.3
(Continued)

FOREIGN PATENT DOCUMENTS

| EP | 1 674 333 | 6/2006 |
|---|---|---|
| JP | 9-132101 | 5/1997 |

(Continued)

OTHER PUBLICATIONS

Extended European Search Report for EP 16 17 7954.1 dated Dec. 9, 2016.

*Primary Examiner* — Nicole T Verley
(74) *Attorney, Agent, or Firm* — Greenblum & Bernstein, P.L.C.

(57) ABSTRACT

A vehicle seat includes: a seat shell; a seat pad disposed on a support surface of the seat shell, the support surface being configured to support a seated occupant; an airbag device held at an outer side of a side portion of the seat shell in its width direction, the airbag device being configured to be deployable on the side of the seated occupant; and a seat cover held taut on the outside of the seat pad. The seat cover covers an outer peripheral surface of the seat pad and an outer peripheral surface of the airbag device. The seat cover comes around behind a rear surface of the seat shell and the seat cover is engaged with the rear surface of the seat shell. The rear surface is on the opposite side of the seat shell from the support surface.

7 Claims, 5 Drawing Sheets

(56) References Cited

U.S. PATENT DOCUMENTS

| | | | | |
|---|---|---|---|---|
| 5,860,673 | A * | 1/1999 | Hasegawa | B60R 21/207 280/728.3 |
| 5,893,579 | A * | 4/1999 | Kimura | B60N 2/5825 280/728.3 |
| 6,095,602 | A * | 8/2000 | Umezawa | B60R 21/207 280/730.2 |
| 6,386,577 | B1 * | 5/2002 | Kan | B60R 21/207 280/728.1 |
| 7,393,005 | B2 * | 7/2008 | Inazu | B60N 2/5825 280/728.2 |
| 8,123,246 | B2 * | 2/2012 | Gilbert | B60R 21/207 280/728.2 |
| 8,602,449 | B2 * | 12/2013 | Kojima | B60N 2/449 280/728.2 |
| 9,199,558 | B1 * | 12/2015 | Jovicevic | B60N 2/4256 |
| 9,381,884 | B2 * | 7/2016 | Stone | B60N 2/6009 |
| 2009/0020988 | A1 * | 1/2009 | Sato | B60R 21/207 280/730.2 |
| 2015/0251623 | A1 * | 9/2015 | Fujiwara | B60R 21/207 280/728.2 |
| 2015/0360636 | A1 * | 12/2015 | Kaneko | B60N 2/449 280/730.2 |

FOREIGN PATENT DOCUMENTS

| | | |
|---|---|---|
| JP | 3345279 | 11/2002 |
| JP | 2007-76642 | 3/2007 |

* cited by examiner

VEHICLE SEAT

INCORPORATION BY REFERENCE

The disclosure of Japanese Patent Application No. 2015-139584 filed on Jul. 13, 2015 including the specification, drawings and abstract is incorporated herein by reference in its entirety.

BACKGROUND OF THE INVENTION

1. Field of the Invention

The invention relates to a vehicle seat.

2. Description of Related Art

Some conventional vehicle seats include a seat shell having a shell structure constituting at least a part of a framework of a seat body. Further, some vehicle seats including such a seat shell are provided with an airbag device (see, for example, Japanese Patent Application Publication No. 2007-76642 (JP 2007-76642 A)). The airbag device is held at the outer side of a side portion of a shell seat in its width direction. The outer side of the airbag device needs to be covered, because leaving the airbag device exposed should be avoided in terms of the appearance of a seat body. Thus, the outer side of the airbag device is covered with an additional part, such as a resin molded part, to enhance the appearance of the seat body. On the other hand, when such an additional part is not provided, a pad serving as a cushion material may be extended to the outer side of a side portion of a shell seat in its width direction such that the airbag device is embedded in the pad.

However, when an additional part is provided, an attachment structure (e.g. fitting structure) configured to prevent contact between the airbag device and the additional part is required, which may cause an increase in the dimension of the seat body in its width direction. In addition, providing the additional part may cause a weight increase or a cost increase. On the other hand, when the pad is extended such that the airbag device is embedded therein, the dimension of the seat body in its width direction may be increased. This may cause an increase in the occupied volume of the seat body in a vehicle cabin space, resulting in reduction of design flexibility. In addition, the size of a mold die for molding the pad may be increased.

SUMMARY OF THE INVENTION

The invention provides a vehicle seat including a seat shell having a shell structure constituting at least a part of a framework of a seat body and an airbag device, the vehicle seat being configured to prevent both an increase in the number of components and an increase in the occupied volume of the seat body in the vehicle cabin space that would otherwise be caused due to provision of the airbag device.

An aspect of the invention relates to a vehicle seat including: a seat shell having a shell structure constituting at least a part of a framework of a seat body; a seat pad disposed on a support surface of the seat shell, the support surface being configured to support a seated occupant; an airbag device held at an outer side of a side portion of the seat shell in a width direction of the seat shell, the airbag device being configured to be deployable on a side of the seated occupant; and a seat cover held taut on an outside of the seat pad. The seat cover covers an outer peripheral surface of the seat pad and an outer peripheral surface of the airbag device. The seat cover comes around behind a rear surface of the seat shell and the seat cover is engaged with the rear surface of the seat shell. The rear surface is on the opposite side of the seat shell from the support surface.

The vehicle seat according to the above aspect does not include parts such as an additional part that covers the airbag device. This prevents an increase in the number of components. In addition, the seat cover directly covers the outer peripheral surface of the airbag device. This prevents an increase in dimension of the seat body in its width direction that would be caused due to provision of an additional part, extension of the pad, or the like. Thus, it is possible to provide the vehicle seat including the seat shell having a shell structure constituting at least a part of the framework of the seat body and the airbag device, the vehicle seat being configured to prevent both an increase in the number of components and an increase in the occupied volume of the seat body in a vehicle cabin space that would otherwise be caused due to provision of the airbag device.

In the vehicle seat according to the above aspect, the seat cover may include a first engagement member engaged with an outer peripheral edge of the seat shell, and a second engagement member engaged with a rear surface-side portion of the seat shell, and the seat cover may be held taut along the outer peripheral surface of the airbag device by the first engagement member and the second engagement member.

With this configuration, the airbag device is held more reliably by two engagement members, that is, the first engagement member and the second engagement member.

In the vehicle seat according to the above aspect, the outer peripheral surface of the airbag device may constitute an outer surface of a side portion of the seat body in a width direction of the seat body.

With this configuration, it is possible to prevent both an increase in the number of components and an increase in the occupied volume of the seat body in the vehicle cabin space, while keeping the presentable appearance of the seat body.

In the vehicle seat according to the above aspect, the seat cover may include a backrest covering portion configured to cover a backrest surface of a seatback, and a front covering portion configured to cover a front surface of the airbag device, and both the backrest covering portion and the front covering portion may be secured to the seat shell at the same position.

With this configuration, the backrest covering portion and the front covering portion are secured to the same portion. This simplifies the structure.

In the above configuration, the backrest covering portion and the front covering portion may be coupled to each other, and a coupled portion where the backrest covering portion and the front covering portion are coupled to each other may be secured to the seat shell.

With this configuration, a work of securing the backrest covering portion and the front covering portion is finished in one operation.

According to the above aspect of the invention, it is possible to provide a vehicle seat including a seat shell having a shell structure constituting at least a part of a framework of a seat body and an airbag device, the vehicle seat being configured to prevent both an increase in the number of components and an increase in the occupied volume of the seat body in the vehicle cabin space that would otherwise be caused due to provision of the airbag device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
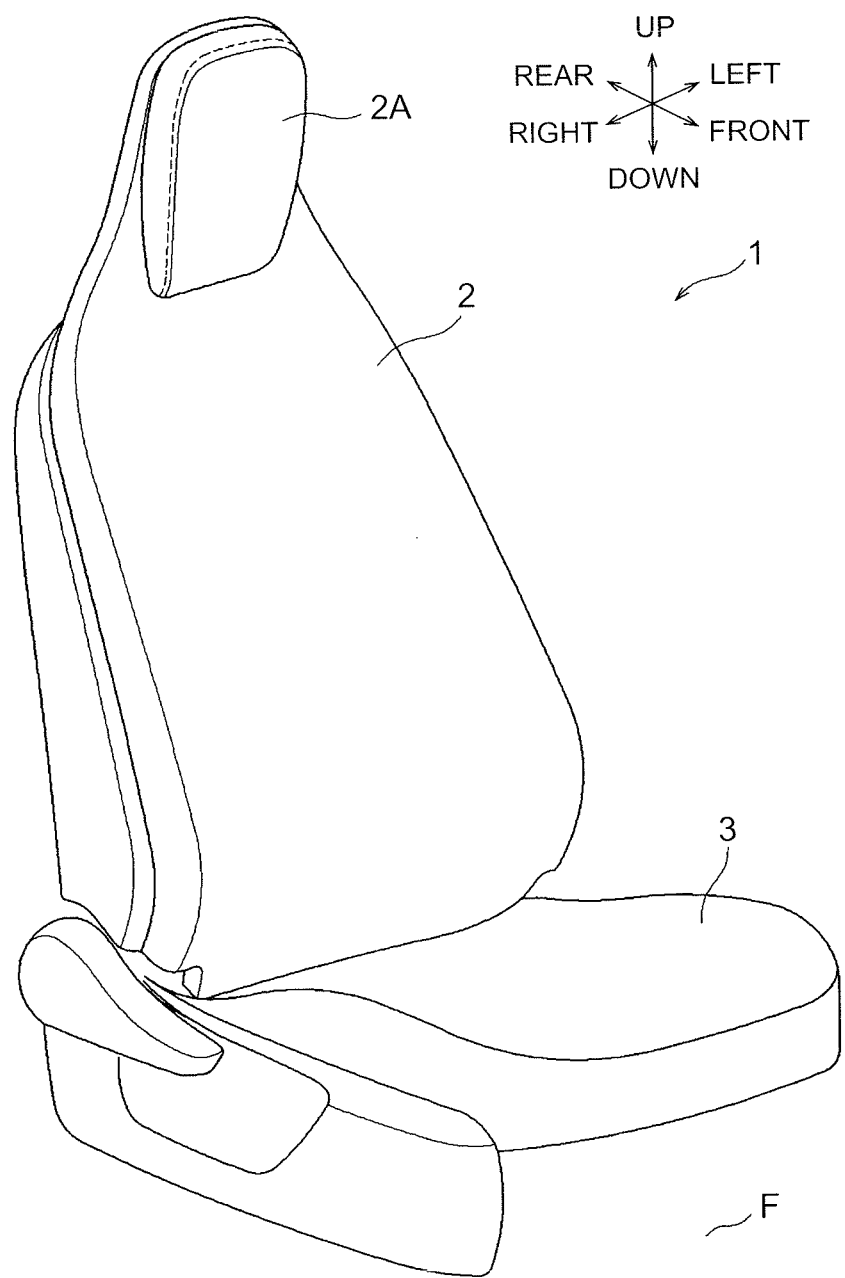
FIG. 1 is an overall front perspective view of a vehicle seat according to a disclosed embodiment.

Hereinafter, embodiments of the invention will be described with reference to the accompanying drawings.

In the present embodiment, a vehicle front seat will be described as an example of a vehicle seat. Directions indicated by arrows in the drawings are directions toward the front side, rear side, upper side, lower side, left side, and right side with respect to an occupant seated in a vehicle seat.

In the vehicle seat according to the present embodiment, as illustrated in FIG. 1, a seat body 1 is disposed on a floor F via slide rails (not illustrated). The seat body 1 includes a seatback 2 serving as a backrest for a seated occupant, and a seat cushion 3 serving as a seating portion. In the vehicle seat according to the present embodiment, an upper section of the seatback 2 largely bulges upward in a convex shape, and a headrest 2A serving as a headrest is provided so as to be integral with the upper section of the seatback 2. Alternatively, the seatback 2 and the headrest 2A may be members different from each other. The seat cushion 3 is a seating portion that is disposed on a metal cushion frame (not illustrated) and that is configured such that a load from a seated occupant is elastically borne by a cushion pad (not illustrated) covered with an upholstery member.

Figure 2:
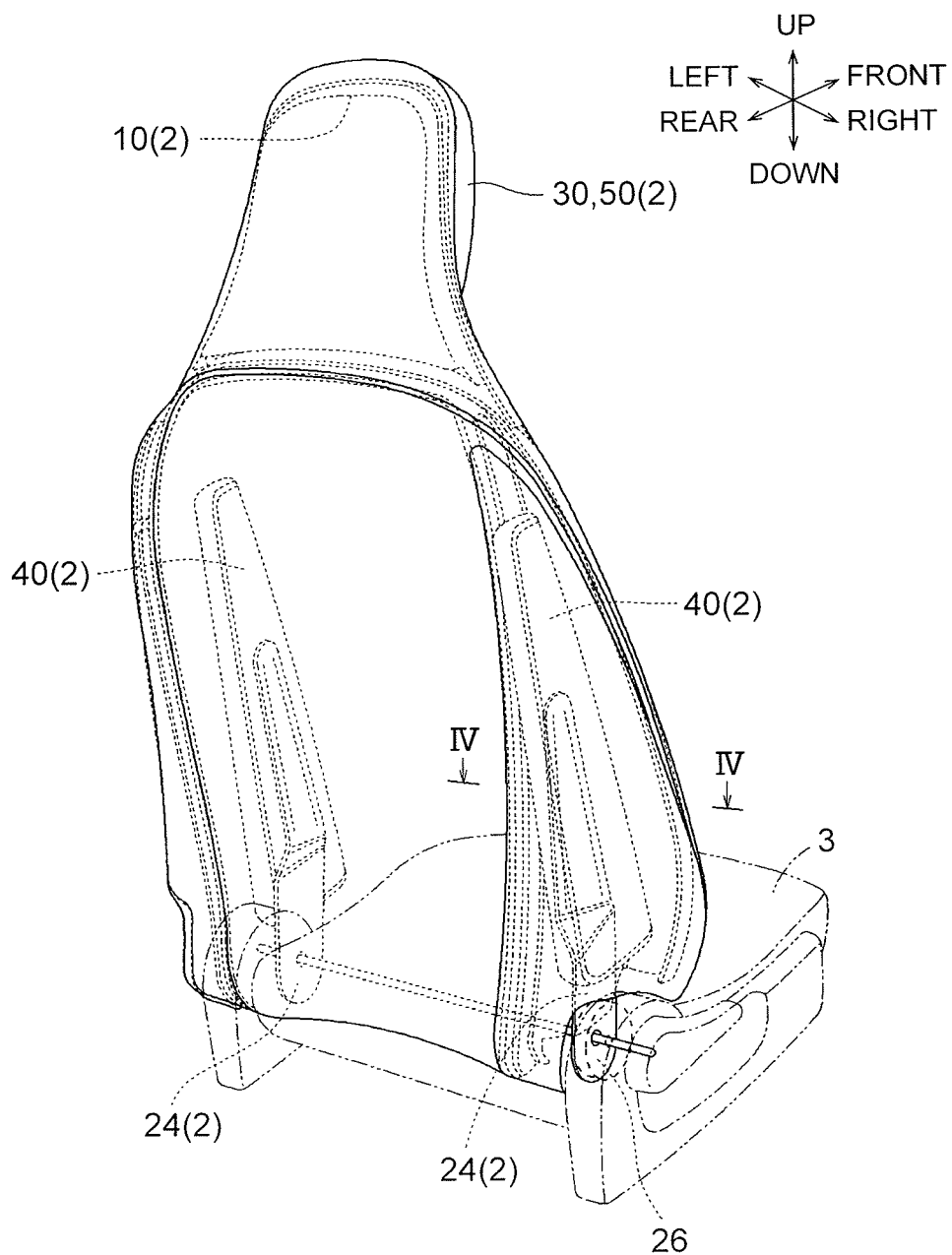
FIG. 2 is an overall rear perspective view of the vehicle seat according to the disclosed embodiment.
Figure 3:
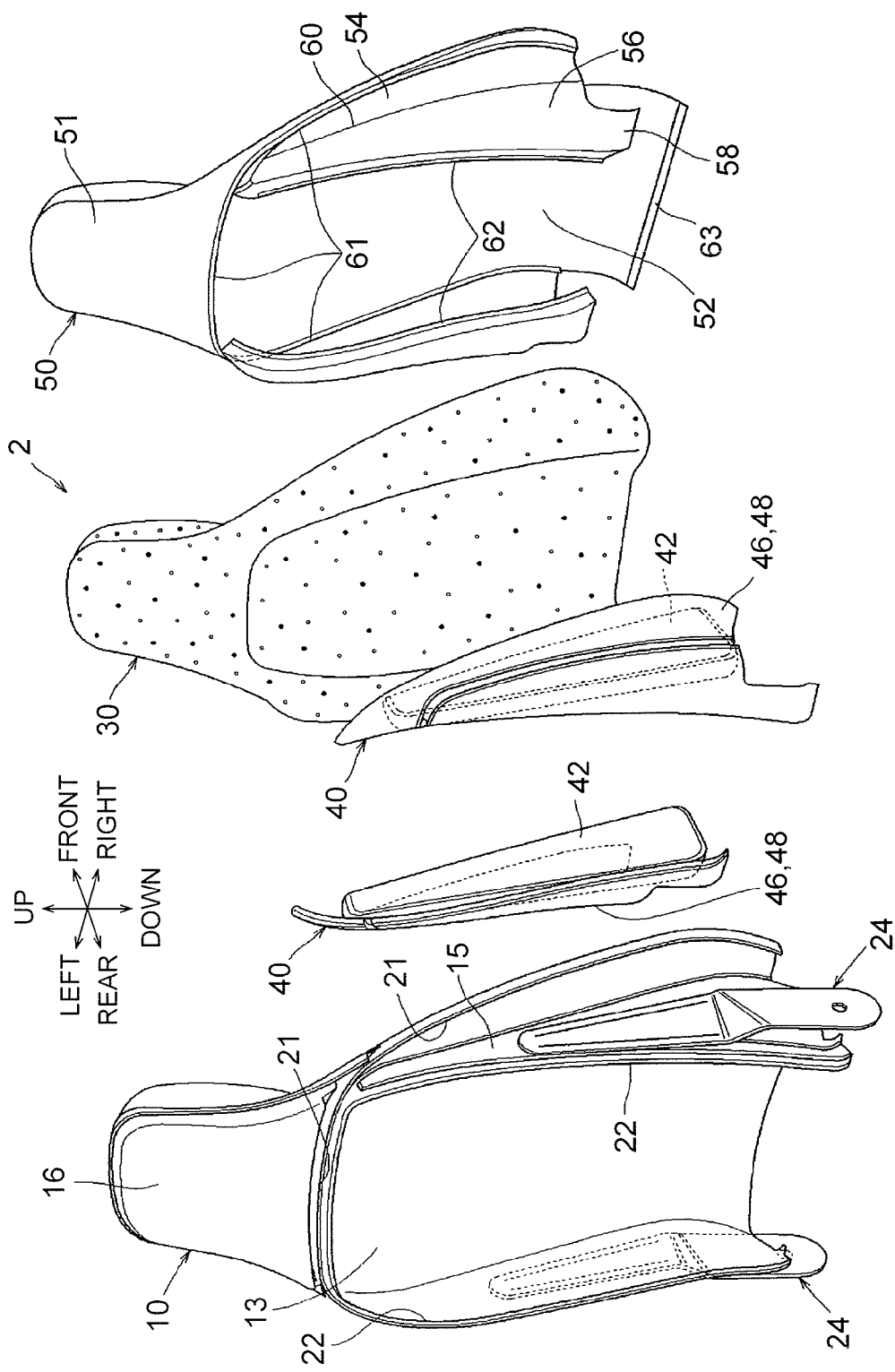
FIG. 3 is an exploded perspective view of the vehicle seat according to the disclosed embodiment.

As illustrated in FIG. 2 and FIG. 3, the seatback 2 mainly includes a back shell 10, side frames 24, a back pad 30, airbag devices 40, and a back cover 50.

Figure 4:
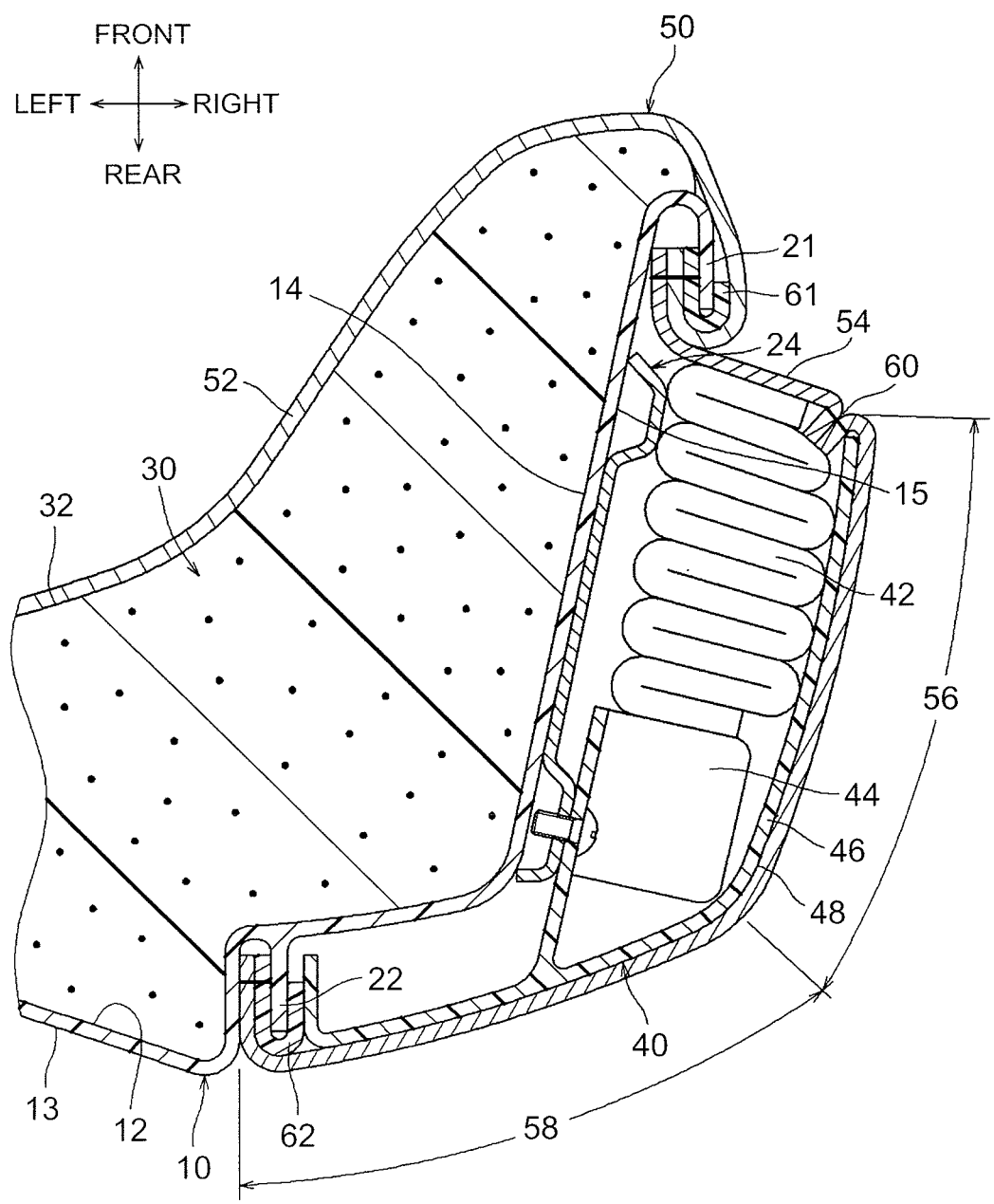
FIG. 4 is a sectional view of the vehicle seat taken along the line IV-IV in FIG. 2.

As illustrated in FIG. 3 and FIG. 4, the back shell 10 (an example of the seat shell) is a frame having a shell structure constituting a framework of the seat body 1. The back shell 10 is in the form of a curved container that holds the body of a seated occupant from his/her back side. The back shell 10 includes a back support portion 12, side support portions 14, and a head support portion 16 that are integral with each other. The back support portion 12 in the present embodiment is an example of "support surface" in the invention. The back support portion 12 supports the back of a seated occupant. The side support portions 14 support the lateral sides of the seated occupant's body from the outside in the lateral direction (i.e., seat-width direction). The side support portions 14 extend from the right and left ends of the back support portion 12 so as to rise forward along the lateral sides of the seated occupant's body. The head support portion 16 supports the head of the seated occupant. The head support portion 16 largely bulges from the upper end of the back support portion 12 upward in a convex shape.

The front end portion of each side support portion 14 has a continuous fin-shaped piece that is folded outward and rearward. A rib-shaped piece that is contiguous with the fin-shaped pieces is provided in the vicinity of the upper end of a rear surface 13 of the back support portion 12 so as to extend across the rear surface 13 in the seat-width direction. The fin-shaped pieces at the front end portions of the right and left side support portions 14 and the rib-shaped piece in the vicinity of the upper end of the rear surface 13 of the back support portion 12 are first engagement pieces 21 with which first engagement members 61 (described later) are engaged. In the present embodiment, the first engagement pieces 21 at the front end portions of the right and left side support portions 14 are each an outer peripheral edge of the back shell 10, and are each an example of "outer peripheral edge of the seat shell" in the invention. When the seatback 2 and the headrest 2A are members different from each other, the first engagement piece is a continuous fin-shaped piece that continuously extends along the front end portions of the right and left side support portions 14 and the upper end of the back support portion 12. The rear surface 13 of the back support portion 12 has continuous rib-shaped pieces extending continuously in the up-down direction. The rib-shaped pieces on the rear surface 13 of the back support portion 12 are second engagement pieces 22 with which second engagement members 62 (described later) are engaged. Each second engagement piece 22 extends upward from the lower end of the seatback 2 up to the position of the first engagement piece 21 at the upper end of the back support portion 12. The second engagement pieces 22 are provided as a pair of right and left engagement pieces.

The back shell 10 is formed in the following manner: A plurality of laminated woven fabric sheets made of, for example, glass fibers or carbon fibers is placed in a molding die having a prescribed shape, liquid epoxy resin or unsaturated polyester resin is injected into the molding die as matrix resin, the woven fabric sheets are impregnated with the resin, and the resin is cured. The back shell 10 in the present embodiment is formed by combining glass fiber woven fabric sheets together using epoxy resin as matrix resin. The back shell 10 is formed in the following method: A plurality of laminated fabric sheets is placed in the molding die constituted by an upper die and a lower die. In this state, as the molding die is closed, a cavity having a shape corresponding to the back shell 10 is formed between the upper die and the lower die. Uncured liquid epoxy resin is injected into the cavity to be reacted and cured, and then the molding die is removed. In this way, the back shell 10 is formed.

In the present embodiment, the back shell 10 serving as the framework of the seatback 2 is described as an example of the seat shell. However, the seat shell is not limited to the back shell 10, as long as the seat shell has a shell structure constituting at least a part of the framework of the seat body 1. For example, the seat shell may be a so-called bucket seat having a shell structure including the seat cushion 3 and the seatback 2 that are integral with each other.

The side frames 24 are provided as a pair of right and left side frames. Each side frame 24 is a bracket formed by stamping a single steel sheet into a substantially flat steel sheet elongated in the height direction. The side frames 24 are fastened to outer sides 15 of the side portions of the back shell 10 in its width direction with bolts or the like. Each side frame 24 is coupled to the back shell 10 such that the side frame 24 is placed on the back shell 10 from the outside so as to extend downward from the substantially central portion of the side portion of the back shell 10 in its height direction. The outer sides of the lower end portions of the side frames 24 are coupled to the right and left rear end portions of the seat cushion 3 (see FIG. 2) via a recliner 26 serving as a rotary shaft device, the rotation of which can be stopped. The side frames 24 support the back shell 10 from the outside to serve as coupling portions that couple the back shell 10 to the recliner 26 (see FIG. 2). Thus, the side frames 24 reliably bear a load of a bending moment due to a load applied to the back shell 10 when a seated occupant leans against the seatback 2, while reliably maintaining the coupling between the back shell 10 and the recliner 26.

The back pad 30 (an example of a seat pad) serves as a cushion material that holds and supports the head and lumbar of a seated occupant. The back pad 30 is disposed on the back support portion 12 of the back shell 10. The front side of the back pad 30 has an outer peripheral surface 32 (an example of an outer peripheral surface of the seat pad) that defines the contour of the seatback 2.

The airbag devices 40 are configured to be deployable on the respective sides of a seated occupant. Each of the airbag devices 40 mainly includes a bag body 42, an inflator 44, and a support case 46. The bag body 42 has a bag structure that allows the bag body 42 to deploy on the side of the seated occupant. The bag body 42 is folded into a compact size. The inflator 44 is configured to generate inflation gas for inflating the bag body 42. The inflator 44 is connected to the bag body 42. The support case 46 supports the bag body 42 and the inflator 44. The support case 46 has an outer peripheral surface 48 that constitutes an outer surface of a side portion of the seat body 1 in its width direction. Specifically, the support case 46 has a generally triangular shape that is tapered upward. In addition, the outer peripheral surface 48 of the support case 46 has a smoothly bulged curved shape. A rib is provided on an inner peripheral surface of the support case 46. The inflator 44 is supported by the rib, and the support case 46 is secured to the side frame 24 with a securing member, such as a bolt. Note that, instead of a bolt, various securing members, such as a screw and a clip, may be employed to secure the support case 46 to the side frame 24.

The back cover 50 (an example of a seat cover) is an upholstery member that is held taut on the outside of the back pad 30. The back cover 50 is made of polyester-fiber fabric. Alternatively, the back cover 50 may be made of synthetic-fiber fabric other than polyester-fiber fabric, synthetic leather, genuine leather, or the like. In addition, there may be employed a multi-layer structure in which a laminated pad made of a urethane foam slab is disposed on the rear surface of the back cover 50 and a rear base material or the like is disposed on the rear surface of the laminated pad. The back cover 50 is formed through draping so as to conform to the contour of the seatback 2. The back cover 50 includes an upper covering portion 51, a backrest covering portion 52, front covering portions 54, side covering portions 56, and back side covering portions 58 that are continuous with each other, or that are sewn together.

The back cover 50 includes the first engagement members 61, the second engagement members 62, and a third engagement member 63 with which the back cover 50 is held taut on the back shell 10. Each first engagement member 61 is made of a resin elastic material (e.g. elastomer). Each first engagement member 61 has a generally J-shape in cross section, and is formed in a linear shape. Each first engagement member 61 has plasticity. Each second engagement member 62 and the third engagement member 63 have the same configuration as that of the first engagement member 61.

The upper covering portion 51 is a bursiform portion that covers the upper section where the headrest 2A is disposed. The backrest covering portion 52 covers a backrest surface of the seatback 2. The backrest covering portion 52 is formed so as to conform to the shape of the backrest side section of the seatback 2. The third engagement member 63 having a linear shape is sewn to the lower end of the backrest covering portion 52. The lower side of the back pad 30 is covered with the backrest covering portion 52, when the third engagement member 63 comes around behind the rear surface of the back shell 10 and is engaged with the rear surface side. Each front covering portion 54 is formed so as to cover a front surface of the airbag device 40. At the boundary between the backrest covering portion 52 and the front covering portion 54, the backrest covering portion 52, the front covering portion 54, and the first engagement member 61 having a linear shape are sewn together. The side covering portion 56 and the back side covering portion 58 are formed so as to conform to the shape of the outer peripheral surface 48 of the support case 46 of the airbag device 40. The side covering portion 56 and the back side covering portion 58 are formed so as to be continuous with each other. At the boundary between the front covering portion 54 and the side covering portion 56, a sewn portion 60 is formed through sewing. The sewn portion 60 is configured to rupture when the bag body 42 is deployed upon actuation of the airbag device 40. As a result, the front covering portion 54 and the side covering portion 56 are separated from each other, so that the bag body 42 inflates outward. The second engagement member 62 having a linear shape is sewn to an edge portion of the back side covering portion 58.

First, the upper covering portion 51 of the back cover 50 covers the upper section where the headrest 2A is disposed. Next, the backrest covering portion 52 covers the outer peripheral surface 32 of the back pad 30, and the first engagement members 61 are engaged with the first engagement pieces 21 of the back shell 10 (an example of a state where both the backrest covering portion and the front covering portion are secured to the seat shell at the same position). Next, the front covering portions 54, the side covering portions 56, and the back side covering portions 58 are held taut along the outer peripheral surfaces 48 of the support cases 46 of the airbag devices 40, the back side covering portions 58 come around behind the second engagement pieces 22 of the back shell 10, and the second engagement members 62 are engaged with the second engagement pieces 22 (an example of a state where the seat cover comes around behind a rear surface of the seat shell and the seat cover is engaged with a rear surface-side portion of the seat shell, the rear surface being on an opposite side of the seat shell from the support surface).

As described above, the vehicle seat according to the present embodiment does not include parts such as additional parts that cover the airbag devices 40. This prevents an increase in the number of components. In addition, the back cover 50 (an example of the seat cover) directly covers the outer peripheral surface 48 of each airbag device 40. This prevents an increase in dimension of the seat body 1 in its width direction that would be caused due to provision of additional parts, extension of the pad, or the like. Thus, it is possible to provide the vehicle seat including the back shell 10 (an example of the seat shell) having a shell structure constituting at least a part of the framework of the seat body 1 and the airbag devices 40, the vehicle seat being configured to prevent both an increase in the number of components and an increase in the occupied volume of the seat body 1 in the vehicle cabin space that would otherwise be caused due to provision of the airbag devices 40. In addition, in the vehicle seat according to the present embodiment, each airbag device 40 is held more reliably by two engagement members, that is, the first engagement member 61 and the second engagement member 62. In addition, with the vehicle seat according to the present embodiment, it is possible to prevent both an increase in the number of components and an increase in the occupied volume of the seat body 1 in the vehicle cabin space, while keeping the presentable appearance of the seat body 1.

In addition, the backrest covering portion 52 and the front covering portion 54 are secured to the same portion. This simplifies the structure. In addition, a work of securing the backrest covering portion 52 and the front covering portion 54 is finished in one operation. This improves the efficiency of the work.

While one embodiment of the invention has been described above, the vehicle seat of the invention is not limited to the foregoing embodiment and may be implemented in various other embodiments. For example, the vehicle is not limited to wheeled vehicles, and the invention may be applied to various kinds of vehicles, such as vessels and aircrafts.

Figure 5:
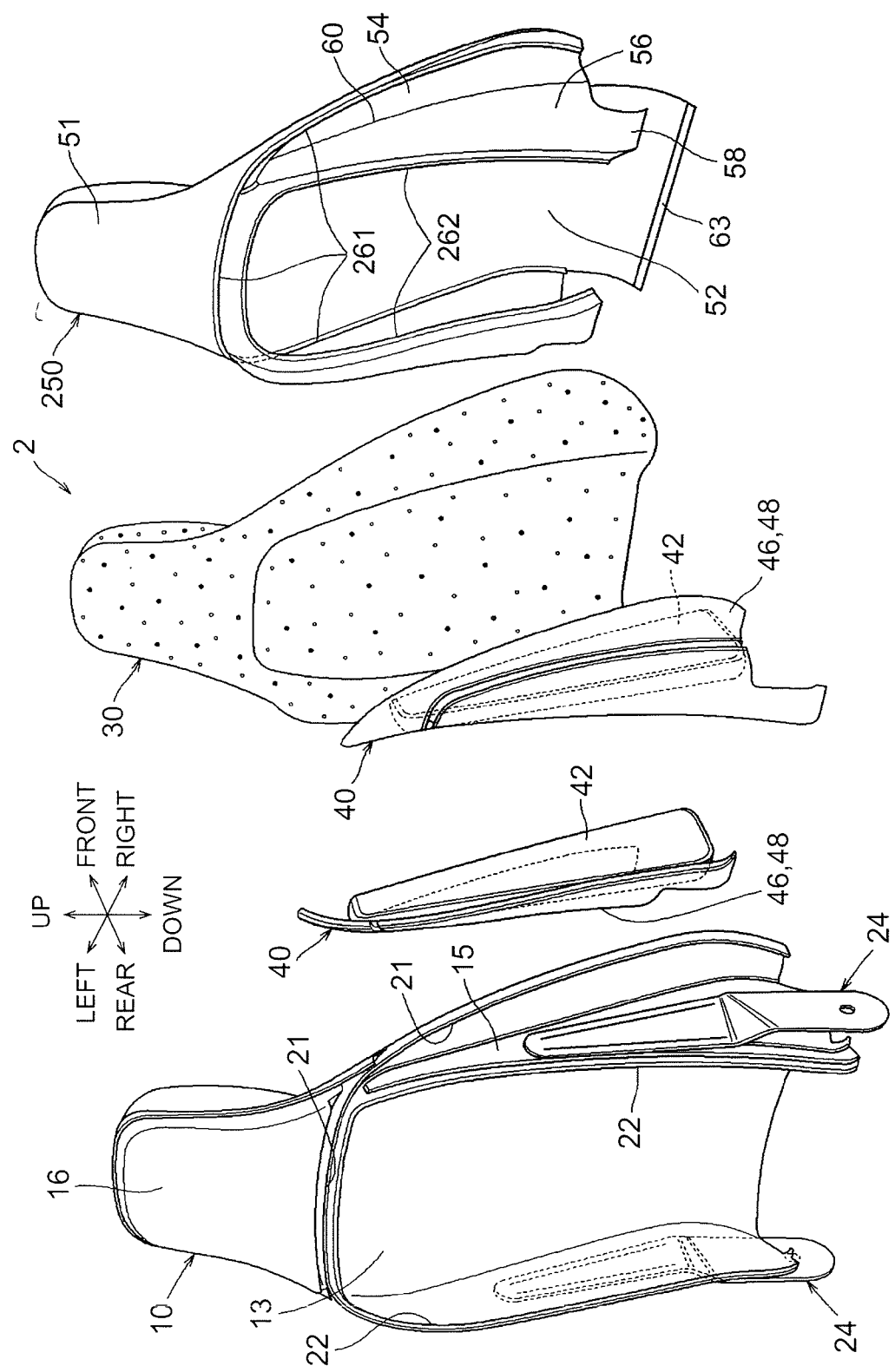
FIG. 5 is a view of a vehicle seat according to a modified example of the disclosed embodiment, FIG. 5 corresponding to FIG. 3.

FIG. 5 illustrates a modified example of the foregoing embodiment. As in a back cover 250 illustrated in FIG. 5, a first engagement member 261 and a second engagement member 262 may be provided in parallel to form a generally U-shape. The first engagement members need not be provided as long as the back cover comes around behind the rear surface that is on the opposite side of the seat shell from the support surface. The seat body 1 according to the foregoing embodiment includes the seatback 2 and the headrest 2A that are integral with each other. Alternatively, a headrest and a seatback may be members different from each other.

What is claimed is:

1. A vehicle seat comprising:
    a seat shell having a shell structure including a back support portion that is configured to support a back of a seated occupant and side support portions that are configured to support lateral sides of the seated occupant, the seat shell comprising at least a part of a framework of a seat body;
    a seat pad disposed on the back support portion of the seat shell;
    an airbag device held at an outer side of one of the side support portions in a width direction of the seat shell airbag device being configured to be deployable on a side of the seated occupant; and
    a seat cover held taut on an outside of the seat pad, wherein
    the seat cover covers an outer peripheral surface of the seat pad and an outer peripheral surface of the airbag device, and
    the seat cover comes around behind a rear surface of the seat shell and the seat cover is engaged with the rear surface of the seat shell, the rear surface being on an opposite side of the seat shell from the back support portion.

2. The vehicle seat according to claim 1, wherein
    the seat cover includes a first engagement member engaged with an outer peripheral edge of the seat shell, and a second engagement member engaged with a rear surface-side portion of the seat shell, and
    the seat cover is held taut along the outer peripheral surface of the airbag device by the first engagement member and the second engagement member.

3. The vehicle seat according to claim 1, wherein the outer peripheral surface of the airbag device comprises an outer surface of a side portion of the seat body in a width direction of the seat body.

4. The vehicle seat according to claim 1, wherein
    the seat cover includes a backrest covering portion configured to cover a backrest surface of a seatback, and a front covering portion configured to cover a front surface of the airbag device, and
    both the backrest covering portion and the front covering portion are secured to the seat shell at the same position.

5. The vehicle seat according to claim 4, wherein
    the backrest covering portion and the front covering portion are coupled to each other, and
    a coupled portion where the backrest covering portion and the front covering portion are coupled to each other is secured to the seat shell.

6. The vehicle seat according to claim 1, wherein
    the seat pad is held directly in contact with the back support portion.

7. The vehicle seat according to claim 4, wherein
    a first end of the front covering portion is in contact with and engaged to the one side support portion and a second end of the front covering portion is in contact with the airbag device.

* * * * *